(12) United States Patent
Froehner et al.

(10) Patent No.: US 10,719,062 B2
(45) Date of Patent: Jul. 21, 2020

(54) TELECONTROL ARRANGEMENT, SYSTEM AND METHOD FOR OBSERVING AND/OR CONTROLLING AN INSTALLATION

(71) Applicant: SIEMENS AKTIENGESELLSCHAFT, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 1351 days.

(21) Appl. No.: 14/826,376

(22) Filed: Aug. 14, 2015

(65) Prior Publication Data

US 2016/0048123 A1 Feb. 18, 2016

Related U.S. Application Data

(63) Continuation of application No. PCT/EP2014/067409, filed on Aug. 14, 2014.

(30) Foreign Application Priority Data

Dec. 8, 2014 (EP) .................................... 14196800

(51) Int. Cl.
  *G05B 19/414* (2006.01)
  *G05B 19/409* (2006.01)
  (Continued)

(52) U.S. Cl.
  CPC ........... *G05B 19/414* (2013.01); *G05B 19/05* (2013.01); *G05B 19/409* (2013.01); *G08C 17/02* (2013.01);
  (Continued)

(58) Field of Classification Search
  CPC ............ H04L 41/0803; H04L 41/5096; H04L 61/1511; H04L 67/125; H04L 67/34;
  (Continued)

(56) References Cited

U.S. PATENT DOCUMENTS 8,665,102 B2 3/2014 Salewske et al.
10,083,484 B2 * 9/2018 Wick ............... G06Q 20/40145
(Continued)

FOREIGN PATENT DOCUMENTS

DE 102007004943 A1 7/2008
EP 2293164 A1 * 3/2011 ......... G05B 19/0428
(Continued)

OTHER PUBLICATIONS

H. Zhou, et al., "The Design and Development of DSP Based Ring Main Unit FTU (Feeder Automation Terminal Unit) in Intelligent Distribution", 2010, pp. 2299-2302, International Conference on Electrical and Control Engineering, IEEE Computer Society.
(Continued)

*Primary Examiner* — Ninos Donabed
(74) *Attorney, Agent, or Firm* — Laurence Greenberg; Werner Stemer; Ralph Locher

(57) ABSTRACT

A telecontrol arrangement observes and/or controls an installation. The telecontrol arrangement is set up to communicate with field devices of the installation and with a control center arrangement. In order to specify a comparatively flexible telecontrol arrangement which can be adapted to change intended purposes with a smaller amount of effort, provision is made for the telecontrol arrangement to be formed in a data processing cloud.

15 Claims, 2 Drawing Sheets

(51) Int. Cl.

| | |
|---|---|
| *H02J 13/00* | (2006.01) |
| *G08C 17/02* | (2006.01) |
| *G05B 19/05* | (2006.01) |
| *H04L 29/08* | (2006.01) |
| *H04L 12/24* | (2006.01) |

(52) U.S. Cl.
CPC .......... *H02J 13/0079* (2013.01); *H04L 67/12* (2013.01); *G05B 2219/40195* (2013.01); *H04L 41/0681* (2013.01); *H04L 41/5096* (2013.01); *H04L 67/125* (2013.01); *Y04S 40/166* (2013.01); *Y04S 40/18* (2018.05)

(58) Field of Classification Search
CPC ..... H04L 41/5048; H04L 45/02; H04L 47/70; H04L 49/70; H04L 63/0823; H04L 63/105; H04L 67/025; G06F 9/45533; G06Q 10/10
See application file for complete search history.

(56) References Cited

U.S. PATENT DOCUMENTS

| | | | | |
|---|---|---|---|---|
| 10,154,077 | B2* | 12/2018 | Paschkes | G06F 16/24578 |
| 2005/0120070 | A1* | 6/2005 | Griech | G05B 15/02 |
| | | | | 709/200 |
| 2005/0197806 | A1* | 9/2005 | Eryurek | G05B 23/0221 |
| | | | | 702/188 |
| 2010/0013632 | A1 | 1/2010 | Salewske et al. | |
| 2011/0296025 | A1* | 12/2011 | Lieblich | G06F 9/5027 |
| | | | | 709/226 |
| 2012/0079125 | A1* | 3/2012 | Nixon | H04L 41/5041 |
| | | | | 709/230 |
| 2012/0147894 | A1* | 6/2012 | Mulligan | G06F 9/45533 |
| | | | | 370/395.53 |
| 2013/0064178 | A1 | 3/2013 | Cs et al. | |
| 2014/0019212 | A1* | 1/2014 | Lieblich | G06F 9/5027 |
| | | | | 705/7.36 |
| 2014/0192676 | A1* | 7/2014 | Sullivan | H04L 41/12 |
| | | | | 370/254 |
| 2014/0214222 | A1* | 7/2014 | Rouse | G06Q 50/06 |
| | | | | 700/291 |
| 2014/0257529 | A1* | 9/2014 | Dicaire | G05B 23/0267 |
| | | | | 700/79 |
| 2015/0018006 | A1 | 1/2015 | Pollmann | |
| 2015/0052253 | A1* | 2/2015 | Johnson | H04L 61/1511 |
| | | | | 709/226 |
| 2015/0088982 | A1* | 3/2015 | Johnson | H04L 67/34 |
| | | | | 709/203 |
| 2015/0127530 | A1* | 5/2015 | Wick | G06Q 40/02 |
| | | | | 705/39 |
| 2015/0317717 | A1* | 11/2015 | Olebe | G06Q 30/0627 |
| | | | | 705/14.54 |
| 2015/0381711 | A1* | 12/2015 | Singh | H04L 41/0813 |
| | | | | 709/221 |
| 2016/0012465 | A1* | 1/2016 | Sharp | G06Q 20/18 |
| | | | | 705/14.17 |
| 2016/0110740 | A1* | 4/2016 | Farrar | G06Q 30/0203 |
| | | | | 705/7.32 |
| 2016/0112262 | A1* | 4/2016 | Johnson | G06F 9/45504 |
| | | | | 709/221 |
| 2017/0278124 | A1* | 9/2017 | Purves | G06Q 30/0229 |
| 2017/0364897 | A1* | 12/2017 | Sarkar | G06Q 30/0631 |
| 2017/0372303 | A1* | 12/2017 | Kochhar | G06Q 20/381 |
| 2018/0013854 | A1* | 1/2018 | Woronka | H04L 41/12 |
| 2018/0068365 | A1* | 3/2018 | Purves | H04L 51/046 |
| 2019/0026824 | A1* | 1/2019 | Wick | G06Q 20/40145 |
| 2019/0089765 | A1* | 3/2019 | Paschkes | G06F 16/24578 |

FOREIGN PATENT DOCUMENTS

| | | |
|---|---|---|
| EP | 2293164 A1 | 3/2011 |
| WO | 2008089902 A1 | 7/2008 |
| WO | 2012028186 A1 | 3/2012 |
| WO | 2013107704 A1 | 7/2013 |

OTHER PUBLICATIONS

I. Dmitrenko, et al., "The Handle of Substation Remote Terminal Unit Configuration", Scientific Journal of Riga Technical University: Power and Electrical Engineering, 2010, pp. 63-68, vol. 27.

* cited by examiner

TELECONTROL ARRANGEMENT, SYSTEM AND METHOD FOR OBSERVING AND/OR CONTROLLING AN INSTALLATION

CROSS-REFERENCE TO RELATED APPLICATION

This is a continuation application, under 35 U.S.C. § 120, of copending international application No. PCT/EP2014/067409, filed Aug. 14, 2014, which designated the United States; this application also claims the priority, under 35 U.S.C. § 119, of European patent application No. EP 14196800.8, filed Dec. 8, 2014; the prior applications are herewith incorporated by reference in their entirety.

BACKGROUND OF THE INVENTION

Field of the Invention

The invention relates to a telecontrol arrangement for observing and/or controlling an installation. The telecontrol arrangement is set up to communicate with field devices of the installation and to communicate with a control center arrangement. The invention also relates to a system and a method for observing and/or controlling an installation.

So-called field devices, control center arrangements and telecontrol arrangements are usually used during the automated operation of installations. In this context, an installation can be understood as meaning any form of industrial installation, for example an electrical installation such as an electrical switching station or an electrical energy supply network, an installation for transporting or distributing solids, gas or liquids or else a chemical or process engineering process installation or a production installation. The invention is only explained by way of example below using an electrical installation. Such an electrical installation contains individual components, for example in the form of lines and cables, switches, transformers, generators, motors, converters, loads, electrical energy generators etc.

Field devices are usually arranged in the spatial vicinity of individual components of the installation and are used, for example, to record measured values which describe a state of the respective components of the installation or to influence states of respective components of the installation. In this context, field devices may be, for example, sensors, for example sensors for measuring electrical variables (for example current, voltage), temperature sensors, flow rate sensors, flow sensors etc., or actuators, for example final controlling elements, switch controllers, valves etc. In addition, field devices may also be intelligent devices (for example so-called intelligent electronic devices (IEDs)) which independently look after tasks for automating the installation (for example so-called error indicators which measure a current flowing in a line and emit an alarm signal if a threshold value is exceeded) while executing particular algorithms. In this context, IEDs may be, in particular, protective and control devices, measuring devices, power quality devices or power meters.

Control center arrangements are individual data processing devices or groups of data processing devices which are arranged centrally or in a decentralized manner and usually execute complex algorithms for observing and/or controlling the installation. Control center arrangements usually have a man-machine interface which makes it possible for an operator of the installation to observe and monitor the state of the installation as a whole and to observe and monitor the state of the individual components of the installation and to control individual or a plurality of components.

Telecontrol arrangements are virtually a link between a plurality of field devices and a control center arrangement and have a communication connection to both the control center arrangement and the field devices for this purpose. For example, measured values from a plurality of field devices may be collected using a telecontrol arrangement and can be forwarded to a control center arrangement. In a corresponding manner, control commands triggered by the control center arrangement can be forwarded to the relevant field devices via the telecontrol arrangement.

In this context, telecontrol arrangements are local communication and control devices which collect the information transmitted by sensors and forward the information to the control center arrangement, undertake simple local control functions and/or forward desired values and control commands to actuators. These local telecontrol arrangements are usually connected to suitable communication modules (for example switches, hubs, routers, modems, communication couplers) in order to interchange information with the control center arrangement according to special telecontrol protocols (for example IEC 60870-5-101/-104). In this case, they use either public communication networks (for example mobile radio or DSL networks) or private communication networks (for example wired communication buses or fiber-optic networks). The field devices (for example sensors, actuators) are usually connected to the telecontrol arrangements via electrical lines (analog or digital) or special bus systems (for example IEC 60870-5-103, Profibus, Modbus etc.).

Telecontrol arrangements are known, for example, from the published, non-prosecuted German patent application DE 10 2007 004 943 A1. The telecontrol arrangements referred to there as "installation processing devices" or "control/regulating devices" are used to connect sensor arrangements and a control center arrangement in the form of a central data processing device. The article "The Handle of Substation Remote Terminal Unit Configuration"; I. Dmitrenko, J. Laugis, published in the Scientific Journal of Riga Technical University: Power and Electrical Engineering, Volume 27, 2010, shows a telecontrol arrangement in the form of a so-called "remote terminal unit" which is connected, on the one hand, to IEDs or sensors/actuators and, on the other hand, to a control center arrangement in the form of a SCADA system (SCADA: "Supervisory Control and Data Acquisition"). The article "The Design and Development of DSP Based Ring Main Unit FTU (Feeder Automation Terminal Unit) in Intelligent Distribution"; H. Zhou, X. Luo, Q. Deng, published as a conference contribution to the International Conference on Electrical and Control Engineering in 2010, describes a telecontrol arrangement which is specifically designed, in terms of its construction and programming, for operation for the purpose of automating branches in electrical distribution networks. Finally, the international patent disclosure WO 2012/028186 A1 discloses a telecontrol arrangement in the form of an extended communication device in which any desired application programs for undertaking automation functions can be installed.

All of the known telecontrol arrangements are local devices which are specifically designed for the respective intended purpose and connect a particular construction to function-specific programming in order to serve a predefined intended purpose. The amount of effort needed for configuration and device maintenance (for example updating of programming, upgrading for the connection of further field devices) is comparatively high.

SUMMARY OF THE INVENTION

The invention is based on the object of specifying a telecontrol arrangement which is more flexible in comparison with the known telecontrol arrangements and can be adapted to change intended purposes with a smaller amount of effort. The invention is also based on the object of specifying a system for observing and/or controlling an installation having an accordingly upgraded telecontrol arrangement and of specifying a method for observing and/or controlling an installation using a corresponding telecontrol arrangement.

With respect to the telecontrol arrangement, this object is achieved, according to the invention, by a telecontrol arrangement of the type mentioned at the outset which is formed in a data processing cloud.

In this case, a data processing cloud is intended to be understood as meaning an arrangement having one or more data storage devices and one or more data processing devices which can be configured to carry out any desired data processing processes by suitable programming. In this case, the data processing devices are generally universal data processing devices (for example servers) which initially do not have any specific design in terms of their construction and programming. The universal data processing device can be upgraded to carry out specific functions only by programming. If the data processing cloud has a plurality of individual components, they are connected to one another in a suitable manner for the purpose of data communication (for example by a communication network). Any desired data may be supplied to a data processing cloud for data storage and/or processing. The data processing cloud itself in turn provides other devices, for example a computer workstation connected to the data processing cloud, with the stored data and/or the results of the data processing which has been carried out. A data processing cloud may be provided, for example, by a computing center or else a plurality of networked computing centers. A data processing cloud is usually spatially remote from the installation.

In the telecontrol arrangement according to the invention, the data processing cloud virtually takes the place of the telecontrol arrangement previously in the form of a specific telecontrol device. On the one hand, this makes it possible to adapt the telecontrol arrangement to the—possibly changing—requirements of the installation in a more flexible manner. For example, adaptation to an increased number of field devices or an increased volume of data provided by the field devices can be carried out by providing accordingly more storage space and computing power of the data processing cloud. In addition, the practice of keeping the telecontrol arrangement as part of the data processing cloud also makes it possible to carry out maintenance and care, which previously had to be locally carried out on the telecontrol devices, in a simpler manner. For example, software needed to operate the telecontrol arrangement can be updated in a simpler manner since this can be carried out using the computing capacities and resources (communication networks etc.) which are present in the data processing cloud anyway. The control center arrangement may be in the form of a separate device in this case, for example in the form of one or more data processing devices in a network control center or a control center of the installation. However, it is also possible to carry out the functions of the control center arrangement on the same computing platform as the telecontrol arrangement, which is to say in the same data processing cloud or in an adjacent data processing cloud, for example. In this case, the interface to the operator of the installation is constituted by simple workstation computers or mobile computing devices (laptops, tablet computers, smartphones and other portable computing devices), while the complex algorithms of the control center arrangement are formed by the data processing cloud.

In order to ensure the security of the communication carried out between the telecontrol arrangement, the field devices and the control center arrangement, encryption methods and authentication methods which are known per se can be used. These may be based, for example, on the interchange of keys and/or certificates. All data stored in the telecontrol arrangement may also be present in encrypted form.

One advantageous embodiment of the telecontrol arrangement according to the invention provides for the telecontrol arrangement to be configured to interchange field-device-specific messages with the field devices and to interchange control-center-specific messages with the control center arrangement, and for the telecontrol arrangement to be configured to convert field-device-specific messages received from the field devices into control-center-specific messages and to transmit them to the control center arrangement and to convert control-center-specific messages received from the control center arrangement into field-device-specific messages and to transmit them to the field devices.

According to this embodiment, the telecontrol arrangement virtually looks after the tasks of a communication gateway and enables seamless communication between the control center arrangement and the field devices of the installation. From the point of view of the control center arrangement or the field devices, the telecontrol arrangement according to the invention advantageously behaves like a previous telecontrol device, with the result that, on account of the use of the telecontrol arrangement according to the invention, no adaptations whatsoever need to be made on the part of the control center arrangement or the field devices.

Field-device-specific messages are those messages which are needed to operate the field devices or are generated during the operation of the latter and are interchanged between the telecontrol arrangement and the field devices. For example, messages which contain measured values recorded by the field devices are field-device-specific messages. Further examples of field-device-specific messages are, on the one hand, messages, alarms, event and/or status information, messages containing values derived from measured values etc. which are generated by the field devices and, on the other hand, commands, desired values, parameter settings and control commands etc. which are transmitted to the field devices.

Control-center-specific messages are those messages which are needed to operate the control center arrangement or are generated during operation of the latter and are interchanged between the telecontrol arrangement and the control center arrangement. For example, messages which contain control commands generated by the control center arrangement are control-center-specific messages. Further examples of control-center-specific messages are, on the one hand, commands, desired values, parameter settings etc. which are generated by the control center arrangement and, on the other hand, messages, alarms, event and/or status information and messages containing measured values or values derived from measured values etc. which are transmitted to the control center arrangement.

In this context, another advantageous embodiment of the telecontrol arrangement according to the invention provides for the telecontrol arrangement to be configured to interchange the field-device-specific messages with the field devices according to at least one first communication protocol supported by the field devices and to interchange the control-center-specific messages with the control center arrangement according to a second communication protocol supported by the control center arrangement.

As a result, on the one hand, the control center arrangement and the field devices can continue to use the communication protocols supported by them anyway even when using the telecontrol arrangement according to the invention. On the other hand, adaptation to communication protocols changed by the control center arrangement and/or the field devices can be easily carried out by accordingly updating the programming of the telecontrol arrangement in the data processing cloud. Even for the situation in which the field devices do not use a standard communication protocol, considerably more flexible adaptation to such different communication protocols than would have been possible in previous telecontrol devices can take place by using the telecontrol arrangement according to the invention. This is because the communication between field devices, such as sensors and actuators, has hitherto not yet been standardized in a consistent manner, with the result that a larger number of different supported communication protocols can also be associated with an increasing number of field devices. Since it is expected that the number of field devices in an installation will tend to increase, a more flexible selection of field devices of the installation can also be made using the telecontrol arrangement according to the invention since the adaptation to the required communication protocols can be easily carried out in the telecontrol arrangement according to the invention. In contrast, previous local telecontrol devices are not configured to communicate with a very large and also variable number of field devices. Nowadays, it is also not possible to directly connect the multiplicity of field devices to the control center arrangement without relatively great adaptations on the part of the control center arrangement since the control center arrangements in operation implicitly presuppose that the many different items of information emitted by the field devices are collected, compressed and preprocessed before being forwarded to the control center arrangement. In this case, the telecontrol arrangement according to the invention makes it possible to easily retrofit existing installations since no adaptation has to be made on the part of the control center arrangement, in particular, because the telecontrol arrangement according to the invention behaves like a conventional telecontrol device with respect to the control center arrangement. At the same time, it provides the required scalability of interfaces, provided communication protocols, computing capacity and data storage space on the part of the field devices in order to be able to connect field devices of any desired type and any desired number.

Another advantageous embodiment of the telecontrol arrangement according to the invention provides for the telecontrol arrangement to have a common communication interface both for communicating with the field devices and for communicating with the control center arrangement.

In this context, provision may be made, for example, for the common interface to be formed by one or more physical communication interfaces (for example Ethernet interfaces), enabling connection both to the field devices and to the control center arrangement. In this case, the field devices, the telecontrol arrangement and the control center arrangement may be effected, for example, using a communication infrastructure which is often already present in the form of a LAN (local area network), a WAN (wide area network), an intranet, the Internet or a combination of said networks.

Another advantageous embodiment of the telecontrol arrangement according to the invention provides for the at least one first communication protocol to be based on an IP-based transmission communication protocol, and for the telecontrol arrangement to be configured to communicate with the field devices using communication addresses which are individually permanently predefined for each of the field devices.

This embodiment uses, in particular, the possibilities provided by the amended IP standard IPv6 for transmitting data in packet-switched networks, in particular the Internet. This is because, according to the IPv6 standard, an address space is created, which address space provides a number of $3.4 \cdot 10^{38}$ individual addresses. This enables the so-called "Internet of things" in which a separate IP address is individually permanently predefined for each device which is able to communicate, with the result that this device, for example a field device, can be individually addressed and identified in the Internet or an IP-based network. In this case, the individual devices may use entirely different application communication protocols or transport communication protocols (for example Modbus TCP, ZigBee IP, Bluetooth, IEC 61850 XMPP) which are effectively based on the IP protocol for transmission in the network. The telecontrol arrangement according to the invention provides the required flexibility and scalability to be able to communicate with such individually addressable field devices; in contrast, there is no need for any complex adaptation of the control center arrangement because the telecontrol arrangement still communicates with the control center arrangement using a standard communication protocol.

Specifically, provision may be made, for example, for the second communication protocol to be a telecontrol protocol (for example according to IEC 60870-5-101/-104, IEC 61850, DNP3i). In this case, the telecontrol protocol used for data transmission may also be based on the IP standard. This makes it possible, for example, for the control center arrangement to communicate with the telecontrol arrangement using the same communication protocol as that which would also be used by it to communicate with a local telecontrol device.

Another advantageous embodiment of the telecontrol arrangement according to the invention provides for the telecontrol arrangement to have an application module which is set up to process received field-device-specific messages according to predefined rules and to form control-center-specific messages and/or further field-device-specific messages with a content dependent on a result of the processing.

In this case, the application module may have, for example, one or more programs which are executed in the data processing cloud and process the field-device-specific messages according to the programs. In this case, the programming can be carried out using any desired programming languages, for example using program lists or so-called CFC plans (CFC: continuous function chart).

For example, provision may be made for the application module to be used to execute a program which processes measured values contained in field-device-specific messages, in the form of compression, for example by averaging, the formation of phasor measured values (formation of so-called phasors) or the formation of RMS values (RMS: root-mean-square), and uses the compressed measured values to form control-center-specific messages and forwards these messages to the control center arrangement for display and/or evaluation. Another possible way of compressing measured values is to use only those measured values which indicate a significant deviation (for example change by more than 5%) from preceding measured values to form control-center-specific messages. In this case, the telecontrol arrangement consequently carries out the functions of a data compressor or data concentrator.

Another possibility for the processing by the telecontrol arrangement involves temporally relating the data (for example measured values) contained in the field-device-specific messages to data from other field devices and incorporating the data temporally related to one another in this manner in control-center-specific messages and transmitting them to the control center arrangement.

Another possibility for the processing by the telecontrol arrangement involves evaluating the data contained in the field-device-specific messages according to predefined rules in order to determine whether they indicate an error or a fault in the operating sequence of the installation. The result of the evaluation (for example the exceeding of a threshold value of a current or a temperature) can then be used to generate a control command in order to initiate an action in one or more of the field devices (for example to open a switch). The control command formed is incorporated in a further field-device-specific message which is then transmitted to the relevant field device (or the relevant field devices). In this case, the telecontrol arrangement thus has a certain amount of its own intelligence for independently carrying out automation functions for the installation.

The telecontrol arrangement can be operated, for example, by the same operator as the installation. In this case, the function of one or more conventional telecontrol devices would be virtually shifted to a data processing cloud provided by the operator of the installation. For example, this could be a computing center belonging to the installation operator. However, another embodiment of the telecontrol arrangement according to the invention may also provide for the telecontrol arrangement to be assigned to an operator other than the operator of the installation. For the operator of the installation, this may have the advantage that the operator himself does not need to worry about the operation and maintenance of the telecontrol arrangement, but rather has transferred these tasks to the operator of the data processing cloud provided by said operator as a service.

Another advantageous embodiment of the telecontrol arrangement according to the invention involves the telecontrol arrangement having a plurality of data areas which are separated from one another and are protected from access to one another, and the telecontrol arrangement being set up to carry out those functions which relate to field devices and control center arrangements of different installations or different operators of installations in respectively different data areas.

In this case, the data processing cloud can be advantageously used in a parallel manner for a plurality of installations; this is because different installations or installations of different operators can be easily separated as a result of the data areas which are separated from one another. In this case, the data processing cloud can be operated by an operator of an installation or by a third party providing one or more operators with the functionalities of a telecontrol arrangement as a service. For example, a first operator can operate a plurality of installations using telecontrol arrangements formed in the data processing cloud. In this case, the telecontrol arrangements can be formed in the same data area or in different data areas of the data processing cloud. A second operator of an installation may likewise operate his installation using a telecontrol arrangement formed in the same data processing cloud; however, the telecontrol arrangement for the installation of the second operator should usually be formed in a data area different from that data area in which the telecontrol arrangements of the first operator are formed in order to be able to provide, on the one hand, clearly delimited automation functions which do not influence one another and, on the other hand, to ensure the necessary data security between the two operators.

The above-mentioned object is also achieved by a system for observing and/or controlling an installation, the system having field devices which are configured to record measured values describing the respective state of components of the installation and/or to influence a respective state of components of the installation, a control center arrangement for observing and/or controlling the installation, and a telecontrol arrangement.

With regard to the system according to the invention, all statements made above and below with respect to the telecontrol arrangement according to the invention and vice versa apply in a corresponding manner; in particular, the telecontrol arrangement according to the invention can be used in any desired embodiment or a combination of any desired embodiments in the system according to the invention. With respect to the advantages of the system according to the invention as well, reference is made to the advantages described with respect to the telecontrol arrangement according to the invention.

One advantageous embodiment of the system according to the invention proposes that the field devices comprise sensors and/or actuators of the installation.

Another advantageous embodiment of the system according to the invention may provide for the field devices to comprise communication devices. In this embodiment, the field devices, for example sensors and actuators with an integrated communication device, can be directly connected to a communication medium for communicating with the telecontrol arrangement.

In this context, one advantageous embodiment of the system according to the invention provides for the communication devices of the field devices to each have individually permanently predefined communication addresses in a format predefined according to the IPv6 standard.

This makes it possible to advantageously use the extended address space provided by the IPv6 standard. In the last 20 years, the Internet and its communication technology based on the IP standard have increasingly found their way into technical and economical processes. Communication via the Internet is also being increasingly accepted in sensitive technical fields. Nowadays, the IPv4 standard is conventional as the fundamental communication layer for Internet communication. Its address space allows up to 4 billion addresses. With the introduction of the new Internet protocol standard IPv6, up to $3.4*10^{38}$ addresses may now be allocated. This allows the "Internet of things", that is to say each device can be provided with its own Internet address. On account of this virtually inexhaustible supply of Internet addresses, technical devices can be equipped with a unique Internet address as early as during production and can be identified during operation. Field devices may thus also already be equipped with a unique communication address ex-works in order to simplify the configuration of installations (for example no dynamic addresses need to be allocated) and to increase the recognizability of the field devices by the telecontrol arrangement using the fixed address.

Another advantageous embodiment of the system according to the invention provides for at least some of the field devices to be connected directly or indirectly to the telecontrol arrangement via a communication bus or a wired communication network.

In this case, the field devices may also communicate with the telecontrol arrangement with the interposition of the Internet or an intranet, for example.

As an alternative to this, provision may also be made for a communication access device to be provided in the spatial vicinity of at least some of the field devices, which communication access device is configured to wirelessly communicate with the at least some field devices and has a direct or indirect communication connection to the telecontrol arrangement. In this manner, field devices which are set up for wireless communication (for example according to WLAN or Wifi, Zigbee, Bluetooth) can be connected to the telecontrol arrangement without complicated cabling. The communication access device may be, for example, a WLAN access point or a WiFi router. Such communication access devices are often also referred to as "hotspots".

Ad-hoc networks, that is to say communication networks without central communication management, can also be formed independently—without the aid of central communication management—between the individual field devices both in wired and in wireless communication networks, for example. This is also suitable, for example, in the case of changing field device configurations; in this case, additional field devices can be easily incorporated in a wireless communication network, and discontinued field devices can accordingly be easily removed from the communication network. In contrast, installation automation systems used nowadays usually use centrally managed communication systems, for example mobile radio, DSL etc., which are not set up to form ad-hoc networks.

Another advantageous embodiment of the system according to the invention provides for the control center arrangement to be directly or indirectly connected to the telecontrol arrangement by a communication network.

The communication network may be the Internet or an intranet, for example. This makes it possible to easily carry out communication between the telecontrol arrangement and the control center arrangement using known IP technologies.

The above-mentioned object is finally also achieved by a method for observing and/or controlling an installation, in which measured values which describe a respective state of components of the installation are recorded and/or respective states of components of the installation are influenced using field devices of the installation and the installation is observed and/or controlled using a control center arrangement.

The invention provides for field-device-specific messages to be interchanged with the field devices and control-center-specific messages to be interchanged with the control center arrangement using a telecontrol arrangement which has a communication connection to the field devices, on the one hand, and to the control center arrangement, on the other hand.

With respect to the method according to the invention, all statements made above and below with respect to the telecontrol arrangement according to the invention and the system according to the invention and vice versa apply in a corresponding manner; in particular, the telecontrol arrangement according to the invention and the system according to the invention are set up, in any desired embodiment or a combination of any desired embodiments, to carry out the method according to invention. With respect to the advantages of the method according to the invention as well, reference is made to the advantages described with respect to the telecontrol arrangement according to the invention and the system according to the invention.

The invention is explained in more detail below using exemplary embodiments. The specific configurations of the exemplary embodiments should not be understood as being restrictive in any way for the general configuration of the telecontrol arrangement according to the invention, the system according to the invention and the method according to the invention; rather, individual configuration features of the exemplary embodiments can be freely combined with one another and with the features described above in any desired manner.

Other features which are considered as characteristic for the invention are set forth in the appended claims.

Although the invention is illustrated and described herein as embodied in a telecontrol arrangement, a system and a method for observing and/or controlling an installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
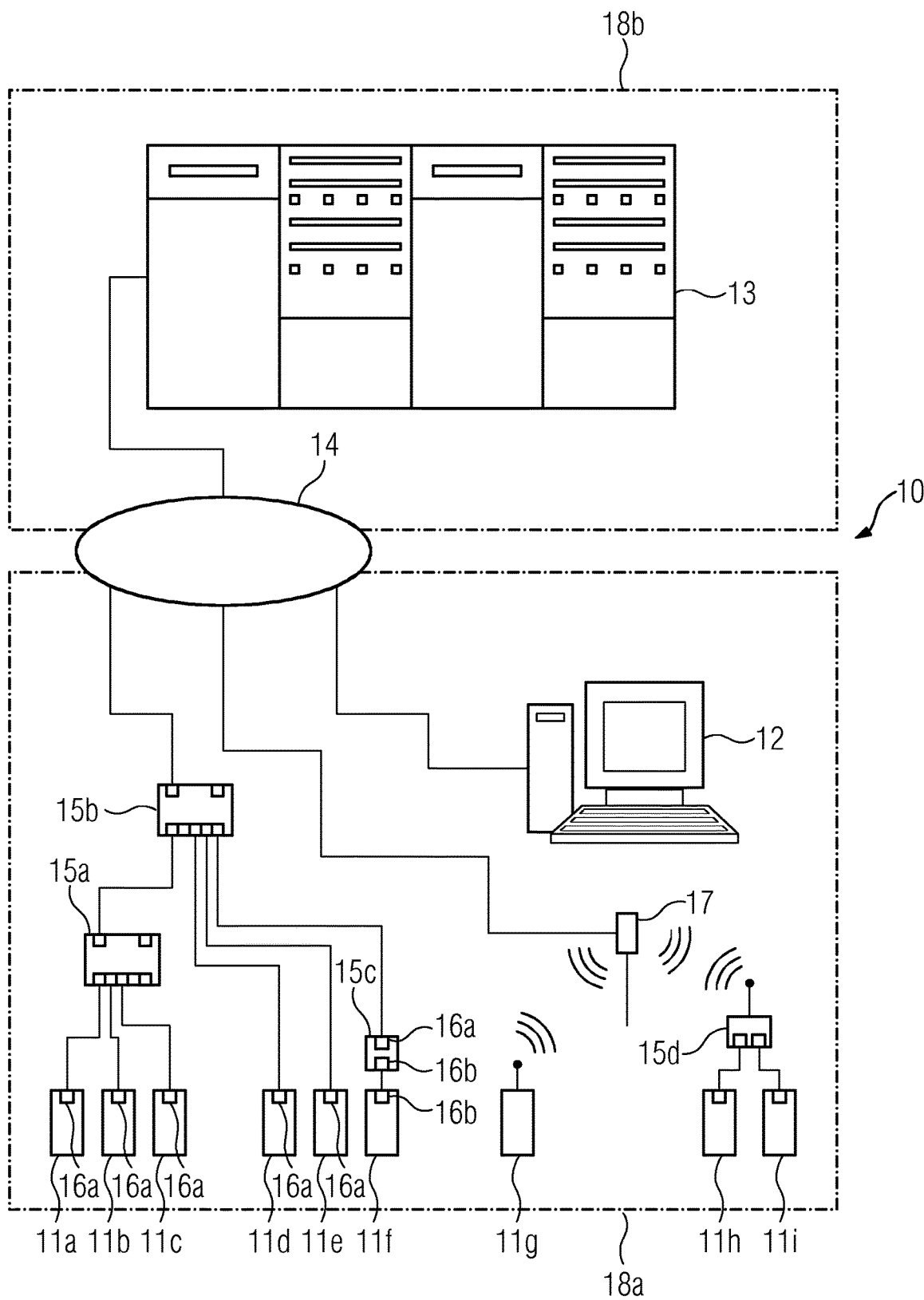
FIG. 1 is a schematic view of a system for observing and/or controlling an installation, which system contains a telecontrol arrangement.

Referring now to the figures of the drawings in detail and first, particularly to FIG. 1 thereof, there is shown a schematic view of a system 10 for observing and/or controlling an installation which is not shown in FIG. 1 for the sake of clarity. The installation may be, for example, an electrical energy supply network or a switching station of an energy supply network. Such an installation has individual components, for example lines, cables, switches, transformers, generators, motors, converters, electrical loads, electrical energy generators, electrical stores etc., the state of which is detected using field devices 11a-i by recording corresponding measured values and/or is influenced by carrying out particular actions (for example controlling a switch). The field devices 11a-i may be, for example, sensors or actuators or so-called IEDs. In order to observe and/or control the installation, provision is also made of a control center arrangement 12 which may be, for example, one or more data processing devices in a control center. The control center arrangement forms the interface to the operating personnel of the installation and is used to evaluate and display operating states of the installation and/or to receive or independently generate control commands for influencing the operating state of the installation.

The system 10 also contains a telecontrol arrangement 13 which has a communication connection both to the control center arrangement 12 and to the field devices 11a-i. The telecontrol arrangement 13 is formed in a data processing cloud. The data processing cloud may be provided, for example, by a server installation or a computing center. In the example according to FIG. 1, the field devices 11a-i, the control center arrangement 12 and the telecontrol arrangement 13 are connected at least indirectly via a communication network 14 which may be the Internet, for example.

The individual field devices 11a-i are indirectly connected to the telecontrol arrangement 13 via the communication network 14. Specifically, the field devices 11a-c are connected to a first switch 15a which is in turn connected to a second switch 15b. The further field devices 11d-f are also connected to the second switch 15b, the field devices 11d and 11e being directly connected to the switch 15b and the field device 11f being connected to the switch 15b via a communication coupler 15c. This is because, whereas the field devices 11a-e each comprise a suitable interface 16a (for example an Ethernet interface) for direct coupling to a communication medium (for example an Ethernet cable) connected to the switch 15a or 15b, the field device 11f lacks such an interface 16a. Instead, the field device 11f has another interface 16b (for example a serial interface). The communication coupler 15c has a corresponding interface 16b, via which it is connected to the field device 11f. In addition, the communication coupler 15c also contains an interface 16a which is suitable for connection to the switch 15b. The communication coupler is consequently used to communicatively couple the field device 11f to the switch 15b and, for this purpose, carries out corresponding communication conversion between the two interfaces 16a and 16b. The switch 15b is finally connected to the communication network 14.

A communication access device 17 which provides an access point for wireless communication connections is also connected to the communication network 14. The communication access device 17 is, for example, a WiFi router or a WLAN access point accordingly configured for operation in installation environments. The field devices 11g-i are connected to the communication access device 17, the field device 11g having its own communication device for wireless communication and being directly connected to the communication access device 17 via the communication device. In contrast, the field devices 11h and 11i do not have their own communication devices for wireless communication and are instead connected to a suitable communication coupler 15d via cable connections. This communication coupler provides an interface for wireless connection to the communication access device 17. The telecontrol arrangement 13 is likewise connected to the communication network 14. This connection may be established directly or indirectly (for example via a DSL connection). In this manner, the telecontrol arrangement 13 is also connected to the field devices 11a-i. For this purpose, the telecontrol arrangement 13 has a suitable interface (for example one or more physical Ethernet interfaces).

In addition to the wired or wireless connection of the field devices 11a-i in the form of a communication network formed in a tree structure or by a communication access device for wireless communication, as illustrated in FIG. 1, other connection possibilities may also be used. For example, the individual field devices 11a-i may each be connected directly, that is to say without the interposition of an additional communication structure, to the communication network 14. A direct connection of the individual field devices 11a-i to the telecontrol arrangement 13 is also conceivable provided that the telecontrol arrangement provides a sufficient quantity of interfaces suitable for this purpose.

The control center arrangement 12 is likewise connected to the communication network 14. This connection can be established directly or indirectly (for example via a DSL connection). In this manner, the telecontrol arrangement 13 is also connected to the control center arrangement 12. For this purpose, the control center arrangement 12 has a suitable interface (for example a physical Ethernet interface).

Field-device-specific messages which contain, for example, measured values from field devices in the form of sensors or control commands for field devices in the form of actuators are transmitted between the field devices 11a-i and the telecontrol arrangement 13. The field-device-specific messages can be designed according to different communication protocols which are supported by the respective field devices 11a-i. TCP/IP, for example, may be chosen as the transport or transmission protocol in order to be able to use widespread Internet technology to transmit the field-device-specific messages. For the purpose of communication, the field devices may have, for example, individually permanently predefined communication addresses, for example IP addresses according to the IPv6 standard.

Control-center-specific messages which contain, for example, control commands for field devices 11a-i, which are generated by the control center through an action of the operating personnel or are generated automatically, or values indicating a state of one or more components of the installation are transmitted between the telecontrol arrangement 13 and the control center arrangement 12. The control-center-specific messages may be configured, for example, according to a telecontrol protocol supported by the control center 12. TCP/IP, for example, may be chosen as the transport or transmission protocol in order to also be able to use widespread Internet technology to transmit the control-center-specific messages.

The telecontrol arrangement 13 provides suitable interfaces and communication protocols for the control center arrangement 12 and the field devices 11a-i. Since the telecontrol arrangement 13 is not in the form of a specifically configured local telecontrol device, but rather is formed in a data processing cloud, simple and flexible adaptation to the respectively required communication protocols can be carried out by accordingly programming the telecontrol arrangement 13. In contrast, there is no need for any adaptations on the part of the field devices 11a-i or the control center arrangement 12.

The telecontrol arrangement 13 is used, on the one hand, as a communication gateway, that is to say it converts the field-device-specific messages into control-center-specific messages and vice versa. In this case, the information contained in the field-device-specific messages may also be compressed or processed in another manner before being forwarded to the control center arrangement 12. In addition, the telecontrol arrangement 13 can also use the data contained in the field-device-specific messages to look after independent automation functions, for example can itself generate a field-device-specific message if a threshold value is exceeded and can transmit it to a field device in order to effect a predefined control action. In order to carry out the respective functions, the telecontrol arrangement 13 has an application module with corresponding programming.

The telecontrol arrangement 13 may be, for example, outside the area of influence 18a of the operator of the installation indicated in FIG. 1 and instead may be assigned to an operator (different from the installation operator) of the data processing cloud, the area of influence 18b of which is likewise indicated in FIG. 1. In this manner, the operator of the data processing cloud can offer the functions of the telecontrol arrangement 13 to the operator of the installation as a service. Alternatively, the data processing cloud may also naturally be operated by the same operator as the installation.

Figure 2:
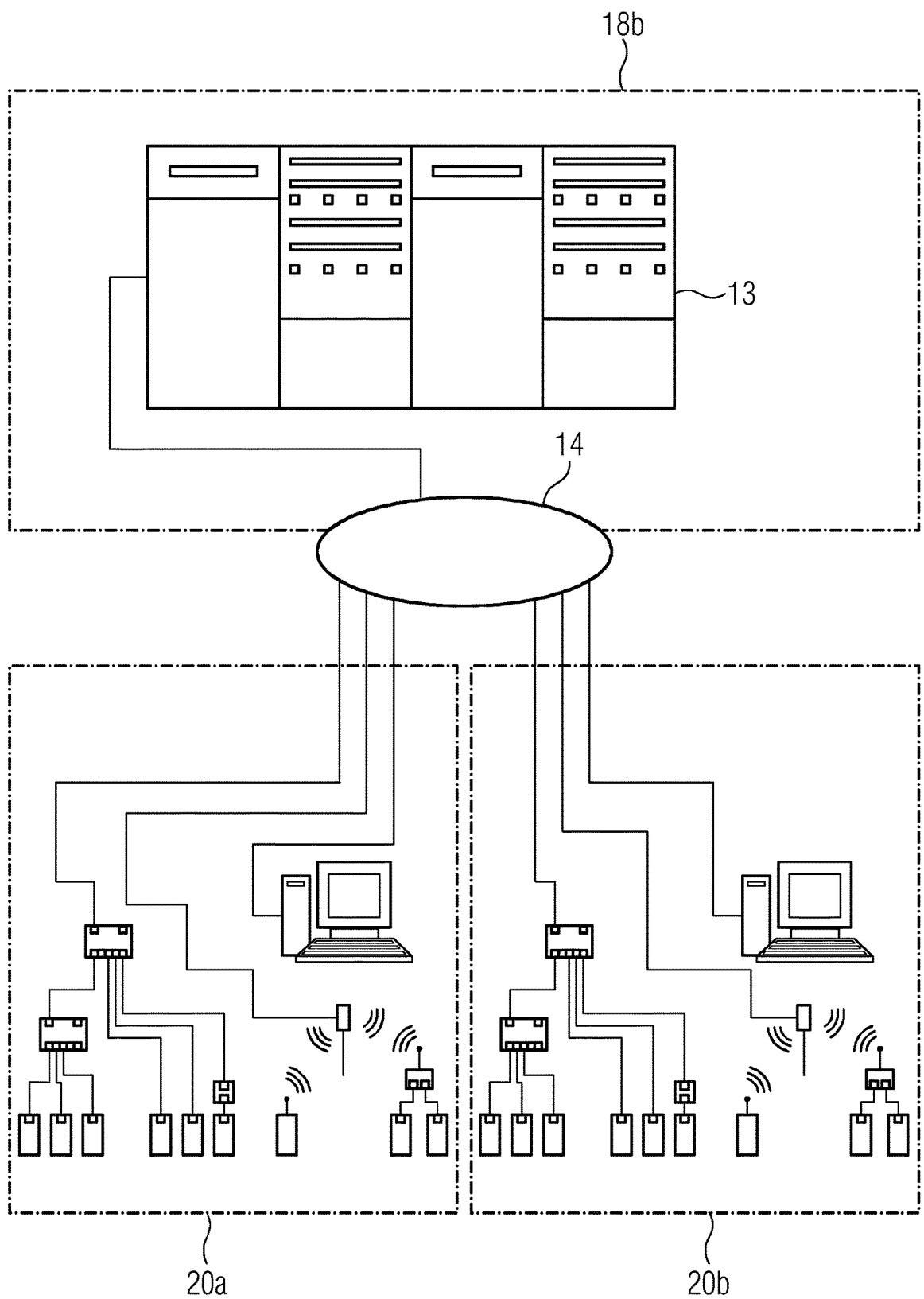
FIG. 2 is a schematic view of a telecontrol arrangement configured to observe and/or control a plurality of installations.

FIG. 2 shows another exemplary embodiment of a telecontrol arrangement 13. The general method of operation of the telecontrol arrangement 13 and its communication connections to field devices and control center arrangements correspond to the method of operation already explained with respect to FIG. 1. However, in the exemplary embodiment according to FIG. 2, the data processing cloud is connected to two installations 20a and 20b. The telecontrol arrangement 13 formed in the data processing cloud therefore has two data areas which are separate from one another and are protected from one another with respect to any access operations, with the result that no write and read access operations can take place between the individual data areas, for example. In addition, the data in the different data areas may be encrypted using different keys in order to further increase the data security. In this embodiment, the telecontrol arrangement 13 is configured in such a manner that the functionalities respectively provided for the two installations and the actions carried out for the two installations are each carried out only in one data area assigned to the relevant installation or to the operator of the relevant installation. Therefore, the telecontrol arrangement 13 can provide and carry out services for more than one installation in a parallel manner. In this case, the installations 20a and 20b can be operated by the same installation operator or by different installation operators. The data processing cloud can be operated by one of the installation operators or by a third party.

It goes without saying that the telecontrol arrangement 13 is not restricted to operation for up to two installations; rather, any desired number of installations may be connected to the telecontrol arrangement 13 provided that the service provided by the data processing cloud allows this.

The invention claimed is:

1. A system for observing and/or controlling an installation, the system comprising:
    a telecontroller communicating with field devices of the installation and with a control center, said telecontroller being formed as part of a data processing cloud and having a processor and a data memory connected to said processor;
    said telecontroller configured to interchange field-device-specific messages with the field devices and to interchange control-center-specific messages with the control center;
    said telecontroller configured to interchange the field-device-specific messages with the field devices according to at least one first communication protocol supported by the field devices, the at least one first communication protocol being based on an IP-based transmission communication protocol;
    said telecontroller is configured to communicate with the field devices using communication addresses which are individually permanently predefined for each of the field devices;
    said telecontroller configured to convert the field-device-specific messages received from the field devices into the control-center-specific messages and to transmit them to the control center and to convert the control-center-specific messages received from the control center into the field-device-specific messages and to transmit them to the field devices;
    said telecontroller has a plurality of data areas which are separated from one another and are protected from access to one another; and
    said telecontroller is set up to carry out functions which relate to the field devices and the control center of different installations or different operators of installations in respectively different data areas.

2. The system according to claim 1, wherein said telecontroller configured to interchange the control-center-specific messages with the control center according to a second communication protocol supported by the control center.

3. The system according to claim 1, wherein said telecontroller has a common communication interface both for communicating with the field devices and for communicating with the control center.

4. The system according to claim 2, wherein the second communication protocol is a telecontrol protocol.

5. The system according to claim 1, wherein said telecontroller has an application module which is set up to process received field-device-specific messages according to predefined rules and to form the control-center-specific messages and/or further field-device-specific messages with a content dependent on a result of processing.

6. The system according to claim 1, wherein said telecontroller is assigned to an operator other than an operator of the installation.

7. A system for observing and/or controlling an installation, the system comprising:
    field devices configured to record measured values describing a respective state of components of the installation and/or to influence the respective state of components of the installation;
    a control center for observing and/or controlling the installation;
    a telecontroller communicating with said field devices and with said control center, said telecontroller is formed as part of a data processing cloud and having a processor and a data memory connected to said processor;
    said telecontroller is configured to interchange field-device-specific messages with said field devices and to interchange control-center-specific messages with said control center;
    said telecontroller configured to interchange the field-device-specific messages with the field devices according to at least one first communication protocol supported by said field devices, the at least one first communication protocol being based on an IP-based transmission communication protocol;
    said telecontroller is configured to communicate with said field devices using communication addresses which are individually permanently predefined for each of said field devices;
    said telecontroller is configured to convert the field-device-specific messages received from said field devices into the control-center-specific messages and to transmit them to said control center and to convert the control-center-specific messages received from said control center into the field-device-specific messages and to transmit them to said field devices;
    said telecontroller has a plurality of data areas which are separated from one another and are protected from access to one another; and
    said telecontroller is set up to carry out functions which relate to the field devices and the control center of different installations or different operators of installations in respectively different data areas.

8. The system according to claim 7, wherein said field devices contain sensors and/or actuators of the installation.

9. The system according to claim 7, wherein said field devices have communication devices.

10. The system according to claim 9, wherein said communication devices of said field devices each have individually permanently predefined communication addresses in a format predefined according to IPv6 standard.

11. The system according to claim 7, further comprising a communications connector selected from the group consisting of a communication bus and a wired communication network, at least some of said field devices are connected directly or indirectly to said telecontroller via said communications connector.

12. The system according to claim 7, further comprising a communication access device disposed in spatial vicinity of at least some of said field devices, said communication access device is configured to wirelessly communicate with said at least some field devices and has a direct or indirect communication connection to said telecontroller.

13. The system according to claim 7, further comprising a communication network connecting said control center directly or indirectly to said telecontroller.

14. A method for observing and/or controlling an installation, which comprises the steps of:
performing at least one of recording measured values describing a respective state of components of the installation or influencing respective states of components of the installation using field devices;
providing a control center for at least one of observing or controlling the installation;
interchanging field-device-specific messages with the field devices and interchanging control-center-specific messages with the control center using a telecontroller having a communication connection to the field devices and to the control center, the telecontroller communicating with the field devices of the installation and with the control center, the telecontroller being formed in a data processing cloud and having a processor and a data memory connected to the processor, the telecontroller having a plurality of data areas which are separated from one another and are protected from access to one another, the telecontroller configured to convert the field-device-specific messages received from the field devices into the control-center-specific messages and to transmit them to the control center and to convert the control-center-specific messages received from the control center into the field-device-specific messages and to transmit them to the field devices;
configuring the telecontroller to interchange control-center-specific messages with the control center, and to interchange the field-device-specific messages with the field devices according to at least one first communication protocol supported by the field devices, the at least one first communication protocol being based on an IP-based transmission communication protocol;
configuring the telecontroller to communicate with the field devices using communication addresses which are individually permanently predefined for each of the field devices; and
the telecontroller carrying out functions which relate to the field devices and the control center of different installations or different operators of installations in respectively different data areas.

15. A system for observing and/or controlling an installation, the system comprising:
a telecontroller communicating with field devices of the installation and with a control center, said telecontroller being formed as part of a data processing cloud and having a processor and a data memory connected to said processor;
said telecontroller configured to interchange field-device-specific messages with the field devices and to interchange control-center-specific messages with the control center;
said telecontroller configured to convert the field-device-specific messages received from the field devices into the control-center-specific messages and to transmit them to the control center and to convert the control-center-specific messages received from the control center into the field-device-specific messages and to transmit them to the field devices;
said telecontroller configured to interchange the field-device-specific messages with the field devices according to at least one first communication protocol supported by the field devices, the at least one first communication protocol being based on an IP-based transmission communication protocol;
said telecontroller is configured to communicate with the field devices using communication addresses which are individually permanently predefined for each of the field devices;
said telecontroller configured to interchange the control-center-specific messages with the control center according to a second communication protocol supported by the control center;
said telecontroller has a plurality of data areas which are separated from one another and are protected from access to one another; and
said telecontroller is set up to carry out functions which relate to the field devices and the control center of different installations or different operators of installations in respectively different data areas.

* * * * *